United States Patent
Shichiken et al.

(10) Patent No.: US 6,857,282 B2
(45) Date of Patent: Feb. 22, 2005

(54) AIR-CONDITIONING SYSTEM FOR VEHICLES

(75) Inventors: Yutaka Shichiken, Konan (JP); Keisuke Hara, Konan (JP)

(73) Assignee: Zexel Valeo Climate Control Corporation, Saitama (JP)

( * ) Notice: Subject to any disclaimer, the term of this patent is extended or adjusted under 35 U.S.C. 154(b) by 0 days.

(21) Appl. No.: 10/602,884

(22) Filed: Jun. 25, 2003

(65) Prior Publication Data

US 2004/0083747 A1 May 6, 2004

(30) Foreign Application Priority Data

Nov. 1, 2002 (JP) ........................................ 2002-319289

(51) Int. Cl.[7] ................................................ B60H 1/32
(52) U.S. Cl. ............................. 62/244; 62/411; 62/419; 454/156
(58) Field of Search .......................... 62/244, 410, 411, 62/419, 426; 454/156, 159, 160, 161

(56) References Cited

U.S. PATENT DOCUMENTS

| | | | | |
|---|---|---|---|---|
| 5,934,989 A | * | 8/1999 | Yamamoto | 454/156 |
| 5,954,578 A | * | 9/1999 | Takasaki | 454/121 |
| 6,178,764 B1 | * | 1/2001 | Tanaka et al. | 62/296 |
| 6,450,246 B1 | * | 9/2002 | Kurokawa et al. | 165/42 |
| 6,651,453 B2 | * | 11/2003 | Klingler et al. | 62/244 |
| 2001/0025707 A1 | * | 10/2001 | Onda et al. | 165/202 |
| 2003/0201096 A1 | * | 10/2003 | Perry et al. | 165/202 |
| 2003/0205370 A1 | * | 11/2003 | Kim | 165/204 |
| 2004/0035140 A1 | * | 2/2004 | Kim et al. | 62/419 |

FOREIGN PATENT DOCUMENTS

| | | | | |
|---|---|---|---|---|
| JP | 359128007 A | * | 7/1984 | |
| JP | 362125911 A | * | 6/1987 | |

* cited by examiner

Primary Examiner—William E. Tapolcai
Assistant Examiner—Mohammad M. Ali
(74) Attorney, Agent, or Firm—Wenderoth, Lind & Ponack, L.L.P.

(57) ABSTRACT

According to the present invention, a blower/evaporator housing case is provided for housing side-by-side a blower that is rotated by a motor and creates an air flow and an evaporator linked with coolant pipes through which a coolant flows in and out so as to completely prevent leakage of condensed water which collects at the evaporator of an automotive air-conditioning system and also to simplify the structure of a locking device used to lock an expansion valve at the evaporator. The blower/evaporator housing case is constituted of two recessed members, i.e., an upper recessed member and a lower recessed member, set on the two sides of a parting line extending along the horizontal direction. The locking device used to lock the expansion valve is formed at joint portions at the edges of the upper and lower recessed members constituting the blower/evaporator housing case.

22 Claims, 10 Drawing Sheets

AIR-CONDITIONING SYSTEM FOR VEHICLES

BACKGROUND OF THE INVENTION

1. Technical Field

The present invention relates to an air-conditioning system for a vehicle that conditions the air in the cabin of the vehicle.

2. Description of the Related Art

Air-conditioning systems for vehicles normally adopt a transverse arrangement having an air blower unit, a cooler unit and a heater unit all set along the width of the vehicle in the related art. However, the on-vehicle computer, the in-cabin CD changer and the air bags, with which a vehicle typically comes equipped today, limit the space under the instrument panel that the transverse air-conditioning system is allowed to take up, and for this reason, the air-conditioning system in the vehicle needs to be miniaturized in all directions, not just along the longitudinal direction extending between the front and the rear of the vehicle.

The concept of reducing the size of an automotive air-conditioning system adopting the transverse arrangement by setting an evaporator at an 80° inclination relative to the width of the vehicle relative to the longitudinal direction extending from the front through the rear of the vehicle and thus reducing the space occupied by the evaporator along the longitudinal direction in the vehicle has been proposed in the related art (see Japanese Unexamined Patent Publication No. H11-5428). In another example of the related art proposed to achieve miniaturization, a blower offset semi-center arrangement, in which a blower unit that blows the air inside and outside the cabin to an evaporator is set next to an integrated air-conditioning unit having the evaporator and a heater core disposed vertically over two stages one on top of the other, to reduce the installation space, is adopted (see Japanese Unexamined Patent Publication No. H8-142640). In yet another example of the related art, the joint portion (parting line) of the evaporator case is formed at the bottom plate of the evaporator case so as to extend along the longitudinal direction further outward relative to the side surface of the evaporator on the side opposite from the drain in order to prevent seepage of condensed water through the joint portion (see Japanese Unexamined Patent Publication No. H10-338020).

While the connecting portions X and Y where the blower unit, the cooler unit and the heater unit are connected retain air-tightness through packing or the like in the air-conditioning system disclosed in Japanese Unexamined Patent Publication No. H11-5428 described above, the connecting portions X and Y are always set along the vertical direction and thus, there is a risk of condensed: water leakage. There is a risk of condensed water leakage in the air-conditioning system disclosed in Japanese Unexamined Patent Publication No. H8-142640, as well, since the joint portion over which the air-conditioning unit and the blower unit are joined with each other extends along the vertical direction. In the air-conditioning system disclosed in Japanese Unexamined Patent Publication No. H10-338020 in which the parting line is present at the bottom, depending upon the manner in which condensed water accumulates, it may flow toward the parting line to result in water leakage even though the parting line is set further outward relative to the side surface of the evaporator. The evaporator case, which is normally constituted of a resin case member, often has a longitudinal parting line to accommodate the two-section structure and thus, the risk of water leakage is inherent.

Accordingly, an object of the present invention is to improve the reliability and contribute to a cost reduction by forming an integrated housing case for housing the blower and the evaporator are housed as an integrated unit to completely prevent leakage of condensed water in an automotive air-conditioning system adopting the semi-center arrangement with the evaporator and heater core disposed one on top of the other and the air blower provided on a side of the evaporator and heater core, to prevent damage caused by insufficient rigidity when transporting the air-conditioning system and also to improve the vibration resistance of the air-conditioning system.

SUMMARY OF THE INVENTION

An air-conditioning system for automotive use according to the present invention, which includes a blower/evaporator housing case that houses, side-by-side along the horizontal direction, a blower that is rotated by a motor and creates an air flow and an evaporator connected to a coolant piping through which coolant flows in/out, is characterized in that the blower/evaporator housing case is constituted with two recessed members, i.e., an upper recessed member and a lower recessed member separated by a parting line extending along the horizontal direction, that an intake unit that selects the source of air to be taken in is connected at an intake port of the blower and that an air-conditioning unit having a heater core which implements outlet temperature control and outlet mode control is connected at a cool air outlet port located further toward the evaporator.

Thus, since the evaporator and the blower are housed inside a single blower/evaporator housing case, the number of required parts is reduced. In addition, as the parting line at the blower/evaporator housing case for housing the blower and the evaporator extends along the horizontal direction, there is no gap through which water would be allowed to leak when condensed water is accumulated at the lower recessed member, and thus the reliability is improved.

The part of the blower/evaporator housing case ranging over one side from the middle of the blower/evaporator housing case constitutes a scroll unit where the blower is housed and the part on the other side constitutes an evaporator housing unit where the evaporator is housed. At the lower recessed member constituting the blower/evaporator housing case, an opening at which the fan of the blower is inserted, a means for condensed water drainage and a drain hole are formed.

Thus, the fan is housed via the opening and the motor is mounted on the outside of the blower/evaporator housing case. In addition, condensed water is guided by the means for drainage which may be, for instance, an inclined surface to be gathered at a single area and is drained to the outside through the drain hole.

At the upper recessed member constituting the blower/evaporator housing case, the intake port and the cool air outlet port mentioned earlier, to which the intake unit and the air-conditioning unit are respectively connected as explained above, are formed.

Joint portions are present at the edges of the upper and lower recessed members constituting the blower/evaporator housing case, and a means for locking that locks an expansion valve is formed on each joint portion.

Thus, as the evaporator is housed in the blower/evaporator housing case, the expansion valve fixed to the front end of the coolant piping, too, becomes firmly attached onto the housing case.

At both the upper and lower joint portions, the means for locking is constituted of a semicircular notch at which the cool piping is clamped and a guard member that covers the expansion valve. As a result, the coolant piping is clamped at the semicircular notches, and although the expansion valve is provided outside the blower/evaporator housing case, its exterior is covered by the guard members for protection. In addition, at the upper and lower guard members, projecting pieces are formed to support from behind a screw hole metal plate used to mount the expansion valve at the coolant piping with screws. Thus, when replacing the expansion valve, the projecting pieces prevent the screw hole metal plate from moving backward, thereby ensuring that the screws can be re-tightened with ease.

The scroll unit and the evaporator housing unit at the lower recessed member are connected with each other through a bridge portion provided toward the engine compartment partitioning wall. The presence of the bridge portion reinforces the structure which is otherwise somewhat lacking in strength with the scroll unit and the evaporator housing unit connected simply via the narrow outlet portion of the scroll unit and the rigidity improves. Consequently, damage due to insufficient rigidity of the air-conditioning system, which may occur when transporting the air-conditioning system, is prevented and the vibration resistance of the air-conditioning system is improved as well.

BRIEF DESCRIPTION OF THE DRAWINGS

The various novel features which characterize the invention are pointed out with particularity in the claims annexed to and forming part of this specification. For a better understanding of the invention, its operating advantages and specific objects obtained by its use, reference should be made to the accompanying drawings and descriptive material in which there is illustrated and described a preferred embodiment of the present invention.

DETAILED DESCRIPTION OF THE PREFERRED EMBODIMENT

Referring to FIGS. 1–5, an air-conditioning system 1 for automotive use comprises the following primary components: a blower/evaporator housing case 2 in which a blower and an evaporator are housed; an intake unit 4 that selects the source of air to be brought in; and an air-conditioning unit 5 having a heater core that implements outlet temperature control and outlet mode control.

Figure 1:
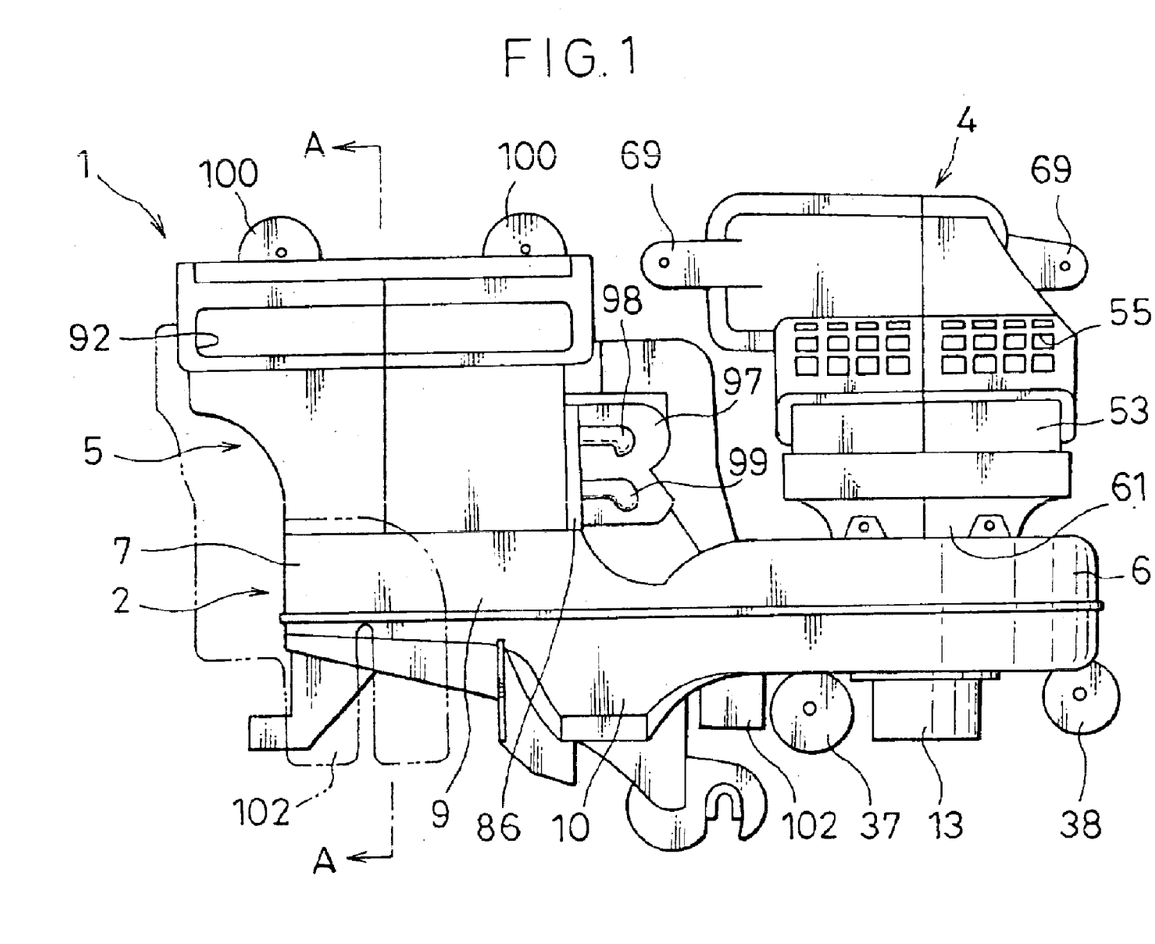
FIG. 1 is a front view of an automotive air-conditioning system according to the present invention.
Figure 2:
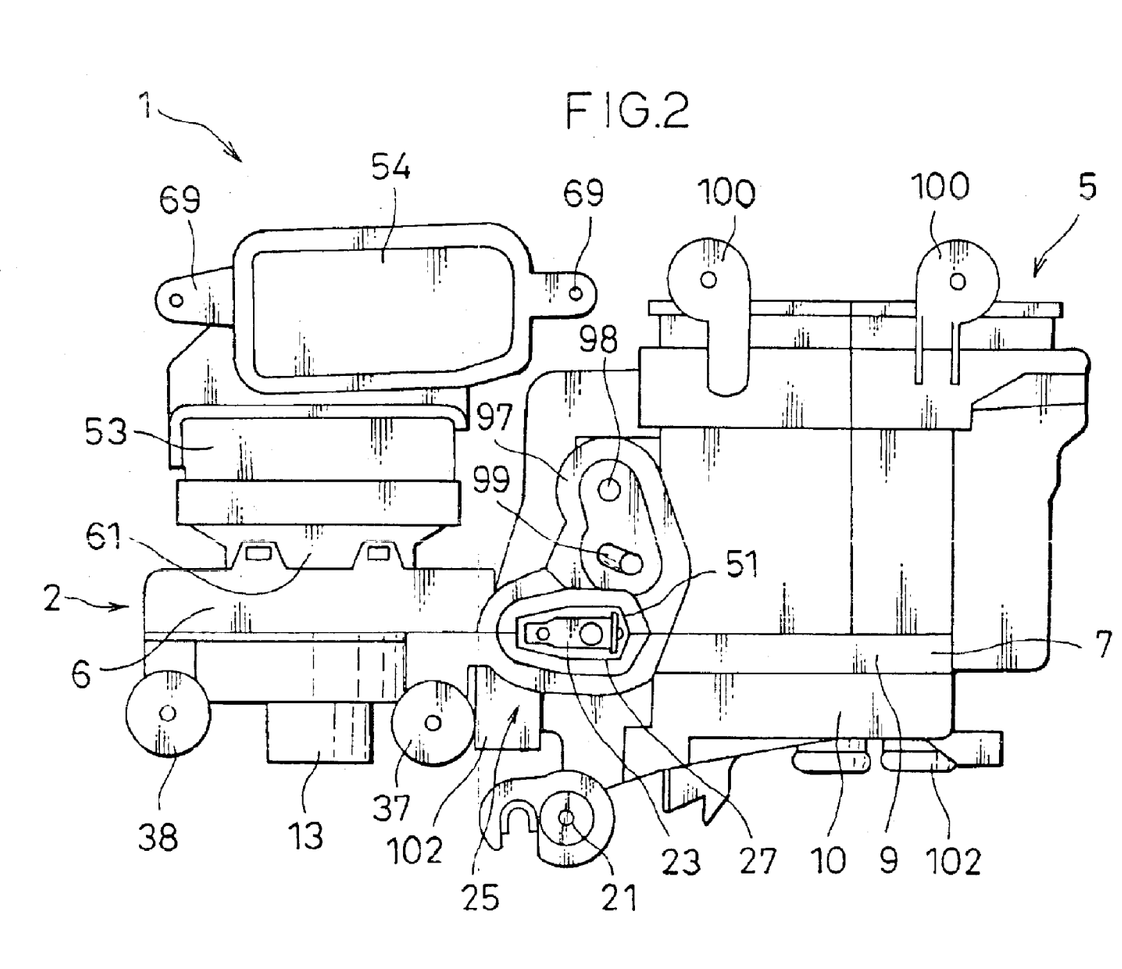
FIG. 2 is a rear view of the air-conditioning system.
Figure 3:
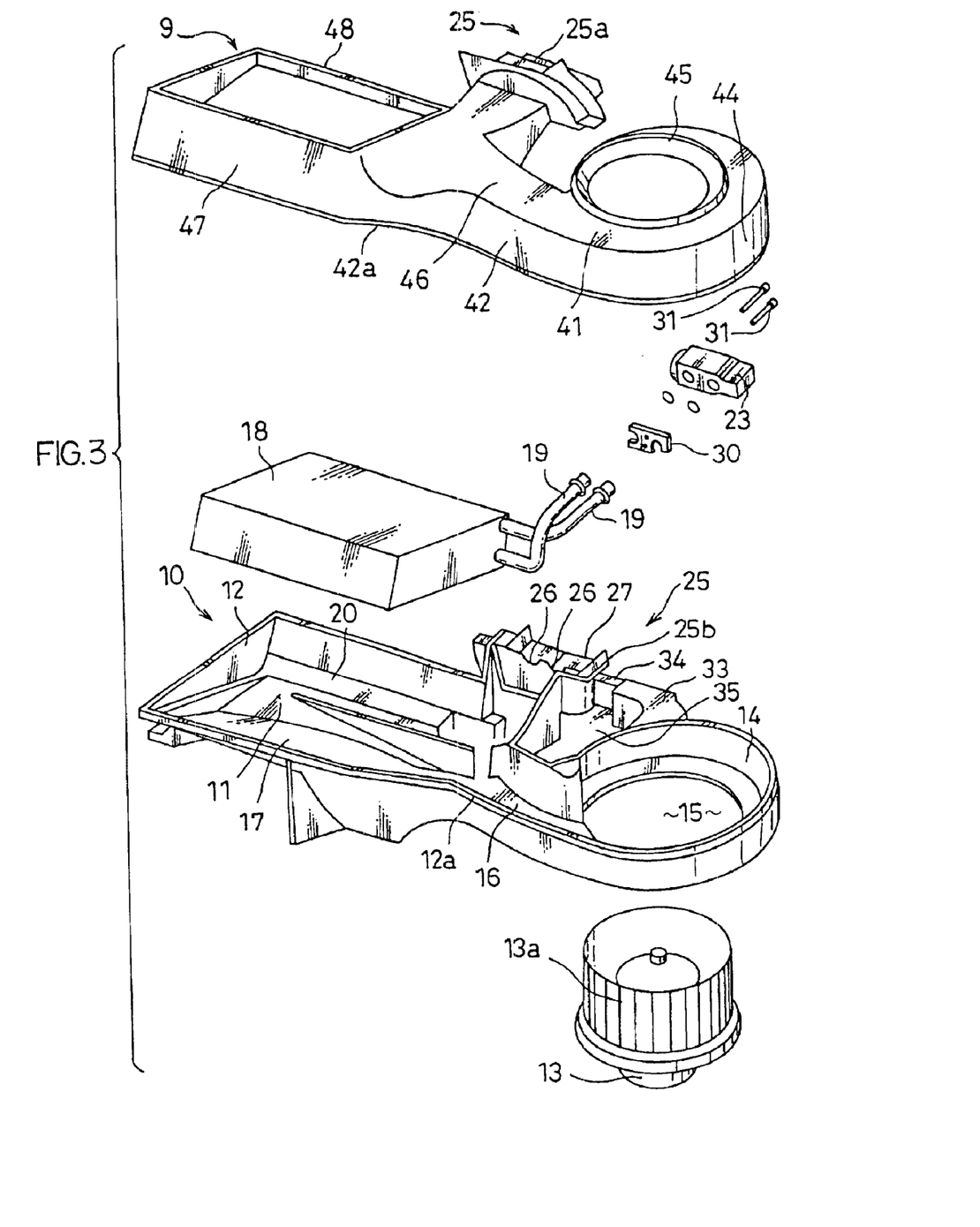
FIG. 3 is an exploded perspective view of a blower/evaporator housing case.

The blower/evaporator housing case 2 includes a scroll unit 6 in which the blower is housed, ranging over one side of the blower/evaporator housing case 2 from the middle as viewed from the front, and an evaporator housing unit 7 in which the evaporator is housed, ranging over the other side. A parting line is formed along the horizontal direction at the blower/evaporator housing case 2, and an upper recessed member 9 and a lower recessed member 10 are aligned with each other along the parting line and are coupled with each other with screws (not shown).

The upper recessed member 9 and the lower recessed member 10 are illustrated in detail in the exploded perspective view presented in FIG. 3. The lower recessed member 10 is first described to better facilitate understanding of the explanation. The lower recessed member 10, which is constituted of a bottom portion 11 and an upright portion 12 rising from the bottom portion 11, also includes a joint portion 12a located at the upright portion 12 on the side opposite from the bottom portion (at the edge of the upright portion 12). At the lower recessed member 10, a scroll-shaped lower case member 14 which is used to form the scroll unit 6 is formed to the right relative to the middle, and a circular opening 15 in which a fan 13a of the blower 13 is inserted is formed at the bottom portion 11 of the scroll-shaped lower case member 14. Thus, the fan 13a of the blower 13 is inserted through the opening 15 and is then fixed to the lower recessed member 10 with screws (not shown). An outlet portion 16 formed through a narrow nose portion of the scroll-shaped lower case member 14 is connected to an evaporator housing lower case member 17 to be detailed later.

The evaporator housing lower case member 17, which is formed as a shallow vessel, is connected to the scroll-shaped lower case member 14 on the right side to achieve an integrated unit and includes an inclined surface for collecting condensed water at one area and a stage 20 on which an evaporator 18 can be placed, both formed at the bottom 11. In addition, a drain 21 through which the collected condensed water is drained is also formed at the bottom 11.

Figure 4:
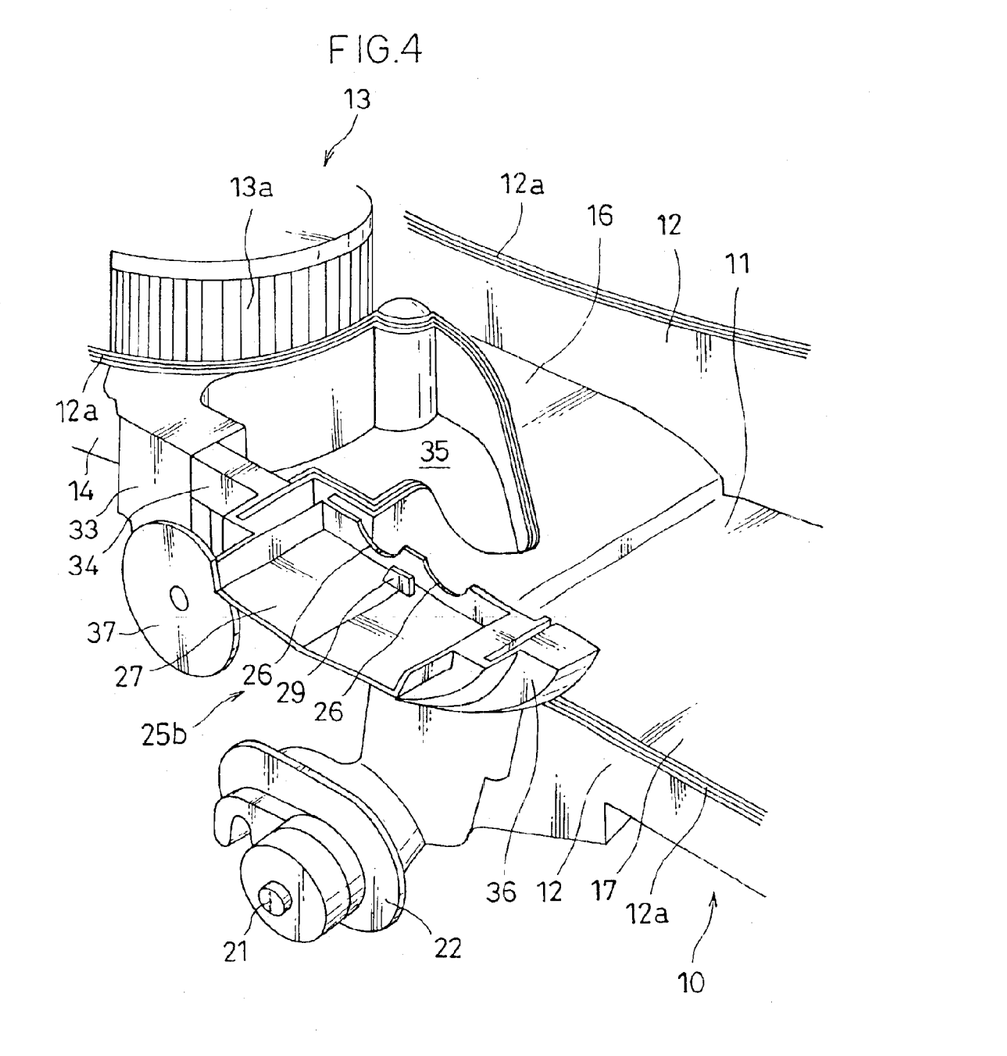
FIG. 4 is a perspective view of an area around a lower locking portion constituting a locking means provided at a lower recessed member of the blower/evaporator housing case.

In addition, as shown in FIG. 4, a lower locking portion 25b, which is one of the two locking portions constituting a locking means (locking clamp device) 25 used to firmly attach an expansion valve 23, is formed at the joint portion 12a of the evaporator housing lower case member 17 near the middle of the lower recessed member 10. The lower locking portion 25b, which makes up a pair together with an upper locking portion 25a provided at the upper recessed member 9 described below, is constituted of two semicircular notches 26 and 26 for clamping coolant pipes 19 and a guard member 27 that covers the expansion valve 23.

The semicircular notches 26 and 26 are formed to have diameters corresponding to the diameters of the coolant pipes 19 and 19, whereas the guard member 27, which extends outward from the evaporator housing lower case member 17 to cover the exterior of the expansion valve 23 has an open front. A projecting piece 29 is formed at the guard member 27 in the vicinity of the semicircular notches 26 and 26. The projecting piece 29 faces opposite a screw hole metal plate 30 provided behind the expansion valve 23 and acts together with a projecting piece 52 (to be detailed below) to prevent a backward movement of the expansion valve 23.

A bridge portion 34 is provided between the lower locking portion 25b and a support arm 33 set on the same plane as the joint portion 12a of the scroll-shaped lower case member 14 and extending from the scroll-shaped lower case member 14, and thus, the lower locking portion 25b is connected with the scroll-shaped lower case member 14 on one side toward the engine compartment partitioning wall (not shown).

Thus, while the connection of the scroll-shaped lower case member 14 and the evaporator housing lower case member 17, which is achieved over the narrow outlet portion 16, is lacking in structural strength, the bridge portion 34 reinforces the structure and the rigidity is thus improved. It is to be noted that a through space 35 is formed in the area enclosed by the bridge portion 34 and the outlet portion 16 of the evaporator housing lower case member 17, and a warm air outlet tube 102, through which warm air is guided toward the passenger's feet in inserted at the through space 35. In addition, reference numeral 36 indicates a pressing portion provided around the locking means 25 and having urethane attached thereto, which presses against the engine compartment partitioning wall, and reference numeral 37 indicates a mounting member provided at the arm portion 33 and used when installing the unit in the car body. Reference numeral 38 indicates a mounting member provided at the evaporator housing lower case member 17.

The upper recessed member 9 is constituted of a bottom portion (ceiling portion) 41 and an upright portion 42 extending from the ceiling portion 41, and also includes a joint portion 42a provided at the upright portion 42 on the side opposite from the ceiling portion (the edge). A scroll-shaped upper case member 44 used to form the scroll unit 6 is present at the upper recessed member 9 further to the right relative to the middle and a round intake port 45 at which the intake unit 4, to be detailed later, is mounted is formed at the ceiling portion 41 of the scroll-shaped upper case member 44. The scroll-shaped upper case member 44 is connected to an evaporator housing upper case member 47 via an outlet portion 46.

In addition, the evaporator housing upper case member 47, which is formed further toward the left relative to the middle of the upper recessed member 9, assumes the shape of an open top case suitable for housing the evaporator 18 and includes a rectangular cool air outlet port 48 formed in the ceiling portion 41.

Figure 5:
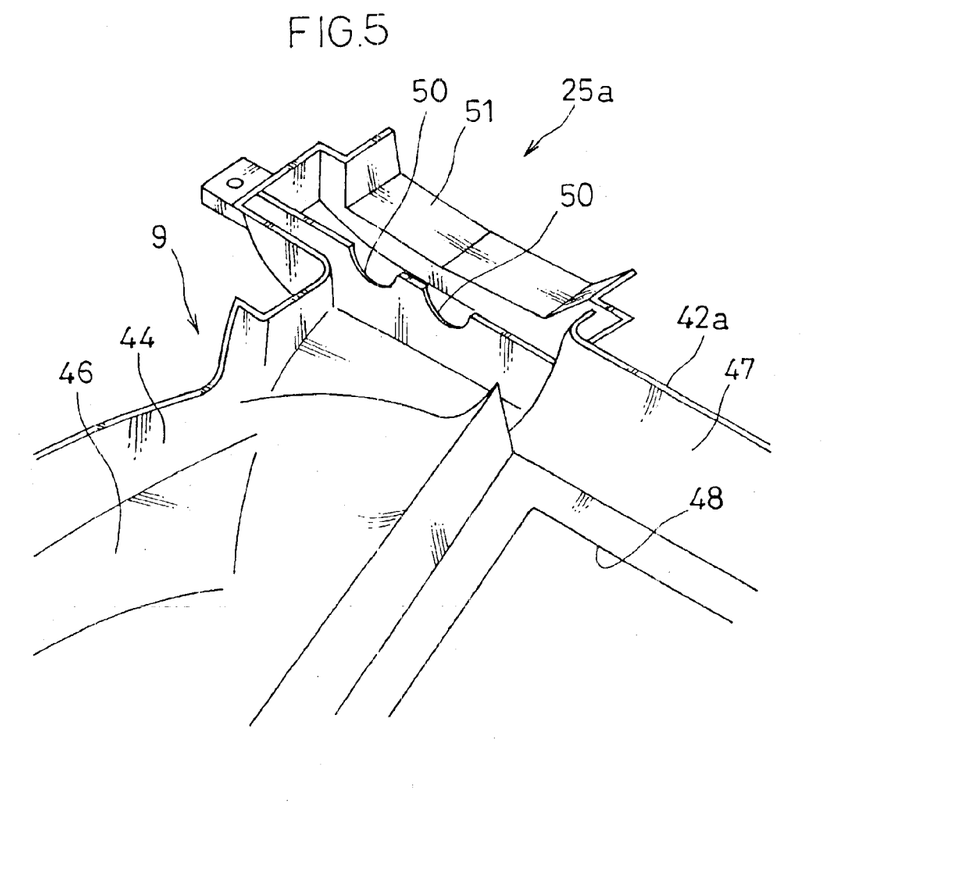
FIG. 5 is the perspective view of an area around an upper locking portion constituting the locking means provide at an upper recessed member constituting the blower/evaporator housing case.
Figure 6:
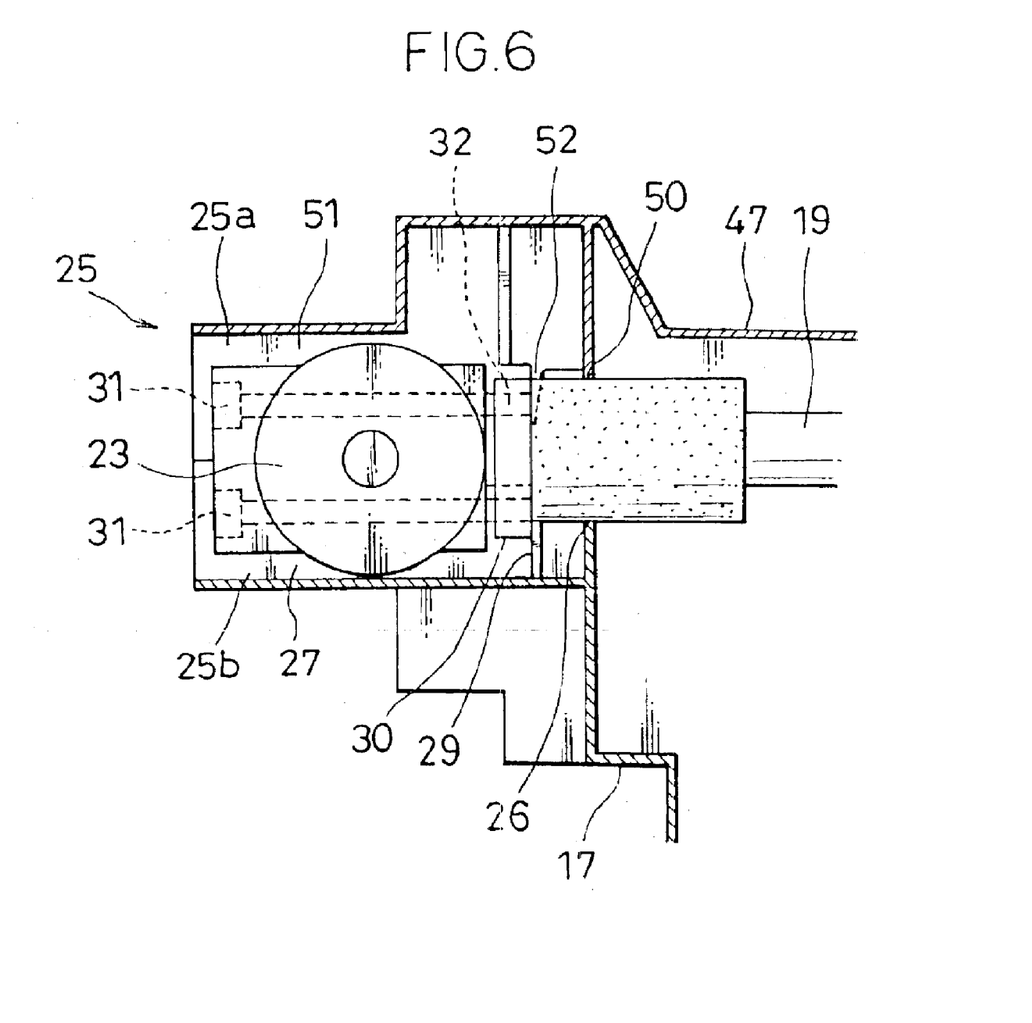
FIG. 6 is a sectional view showing an expansion valve mounted by using the locking means.
Figure 7:
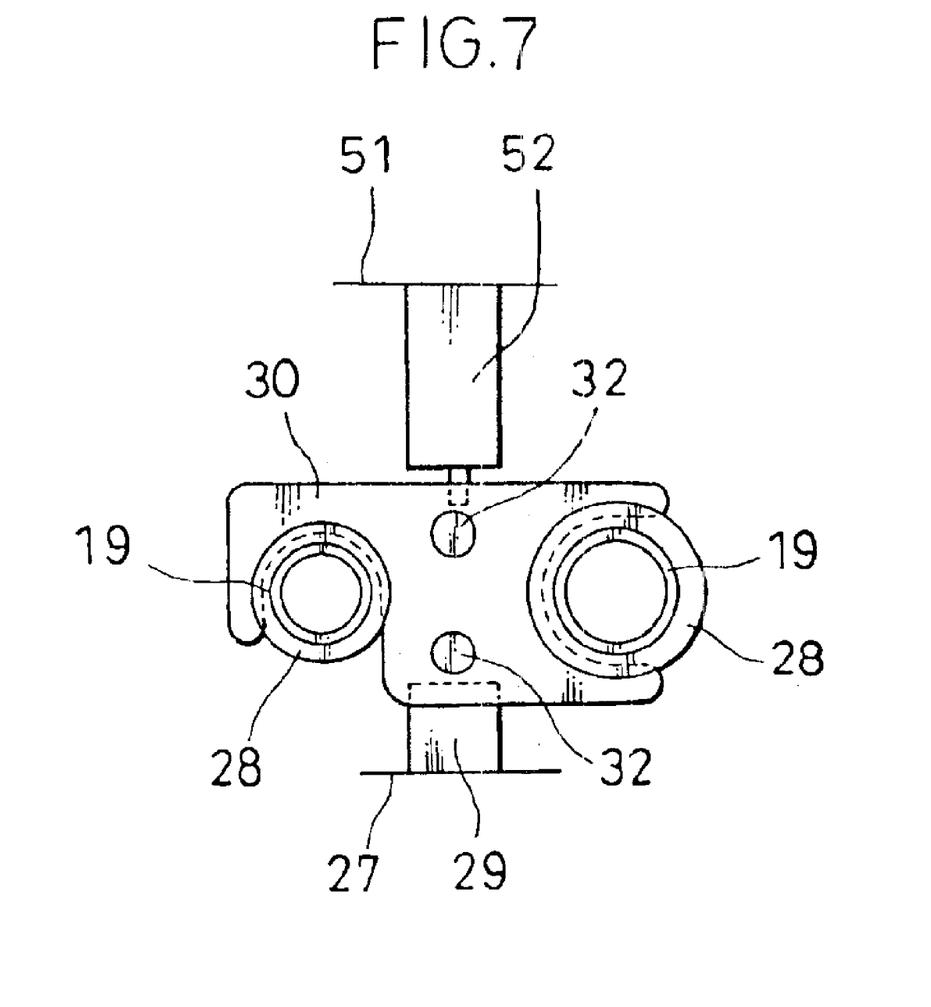
FIG. 7 illustrates a relationship between a screw hole metal plate and projecting pieces observed when the expansion valve having been mounted by using the locking means is disengaged.

In addition, as shown in FIGS. 5, 6 and 7, the upper locking portion 25a constituting the locking means 25 used to firmly attach the expansion valve 23 is formed at the joint portion 42a of the evaporator housing upper case member 47 near the middle of the upper recessed member 9. The upper locking portion 25a, which is paired together with the lower locking portion 25b provided at the lower recessed member 10 (described below), is constituted of two semicircular notches 50 and 50 for clamping the coolant pipes 19 and a guard member 51 that covers the expansion valve 23. The guard member 51, which extends outward from the evaporator housing upper case member 47 to cover the exterior of the upper half of the expansion valve 23 has an open front. The projecting piece 52 is formed at the guard member 51 in the vicinity of the semicircular notches 50 and 50, and this projecting piece 52 faces opposite the screw hole metal plate 30 provided behind the expansion valve 23.

As a result, when the expansion valve 23 is disengaged from the coolant pipes 19 and 19 to be replaced, the screw hole metal plate 30 is prevented from moving backward by the projecting piece 52 and the projecting piece 29, and the new expansion valve 23 can be screwed on with ease by re-tightening screws 31 through the screw holes 32 in the screw hole metal plate 30 without any problem. It is to be noted that the coolant pipes 19 and 19 are held at the screw hole metal plate 30 via collars 28 and 28.

Figure 8:
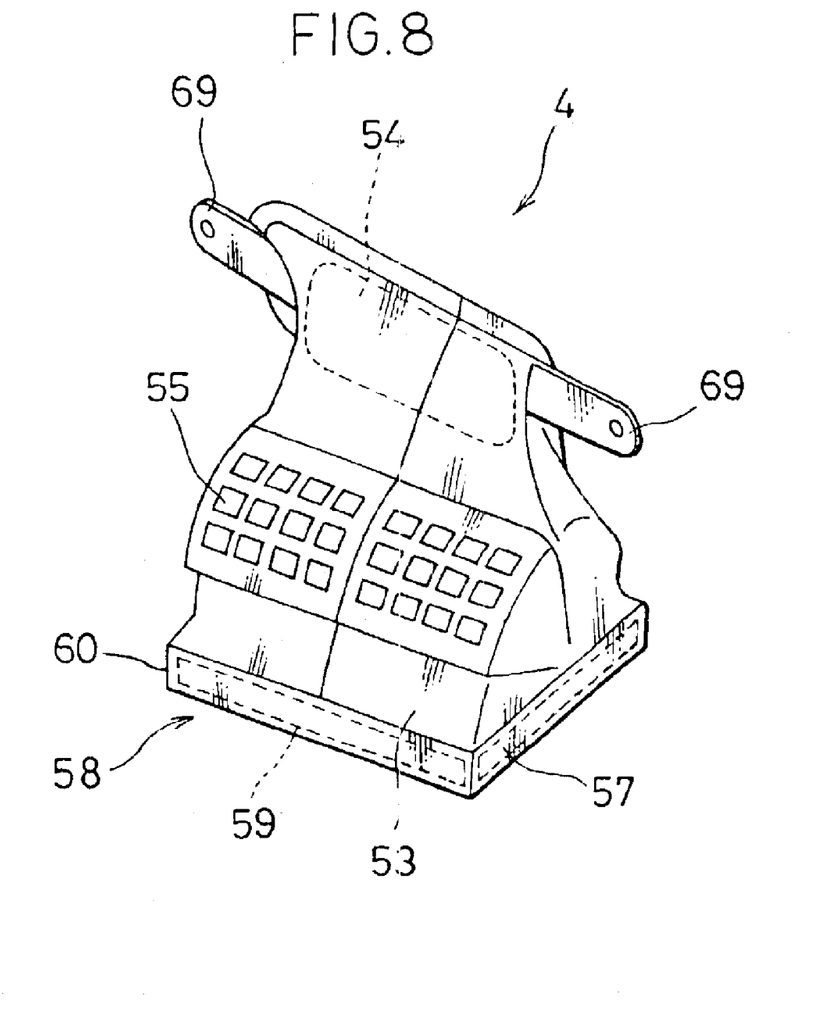
FIG. 8 is a perspective view of an intake unit.

The intake unit 4, which is illustrated in FIGS. 1, 2 and 8, is utilized to selectively supply either the cabin internal air or the external air to the automotive air-conditioning system 1. It includes an external air intake port 54 formed at the very top of an intake case 53 and an internal air intake port 55 formed on the opposite side of the intake case 53. For safety reasons, the internal air intake port 55 is constituted of a group of small openings. Inside the intake case 53, a switching door (not shown) used to selectively switch to the external air intake port 54 or the internal air intake port 55 is provided and the rotation of the switching door is controlled by an actuator (not shown).

An air filter mounting portion 58 at which an air filter 57 is mounted is provided at the intake unit 4. The air filter mounting portion 58 assuming a quadrangular shape is formed along the horizontal direction and includes an insertion port 59 at which the air filter 57 is inserted, located at its front, and a mounting guide (not shown) for providing support for the air filter 57 formed inside the air filter mounting portion 58. Reference numeral 60 indicates a lid that is fitted at the filter insertion port 59.

Below the air filter mounting portion 58, an intake air outflow portion 61 is formed in a round shape so as to fit with the intake port 45 formed in the upper recessed member 9 as mentioned earlier. Thus, air brought in by the intake unit 4 is taken into the blower/evaporator housing case 2 via the intake port 45. Reference numeral 69 indicates a mounting member used when installing the unit in the car body.

The air-conditioning unit 5, which is shown in FIGS. 1, 2, 9 and 10, includes a heater core and implements control of the temperature of the air output and control of the outlet mode. At the air-conditioning unit 5, an air-conditioning case 80 has an open bottom constituting a cool air intake port 81 which is fitted with the cool air outlet port 48 of the blower/evaporator housing case 2 explained earlier.

Figure 10:
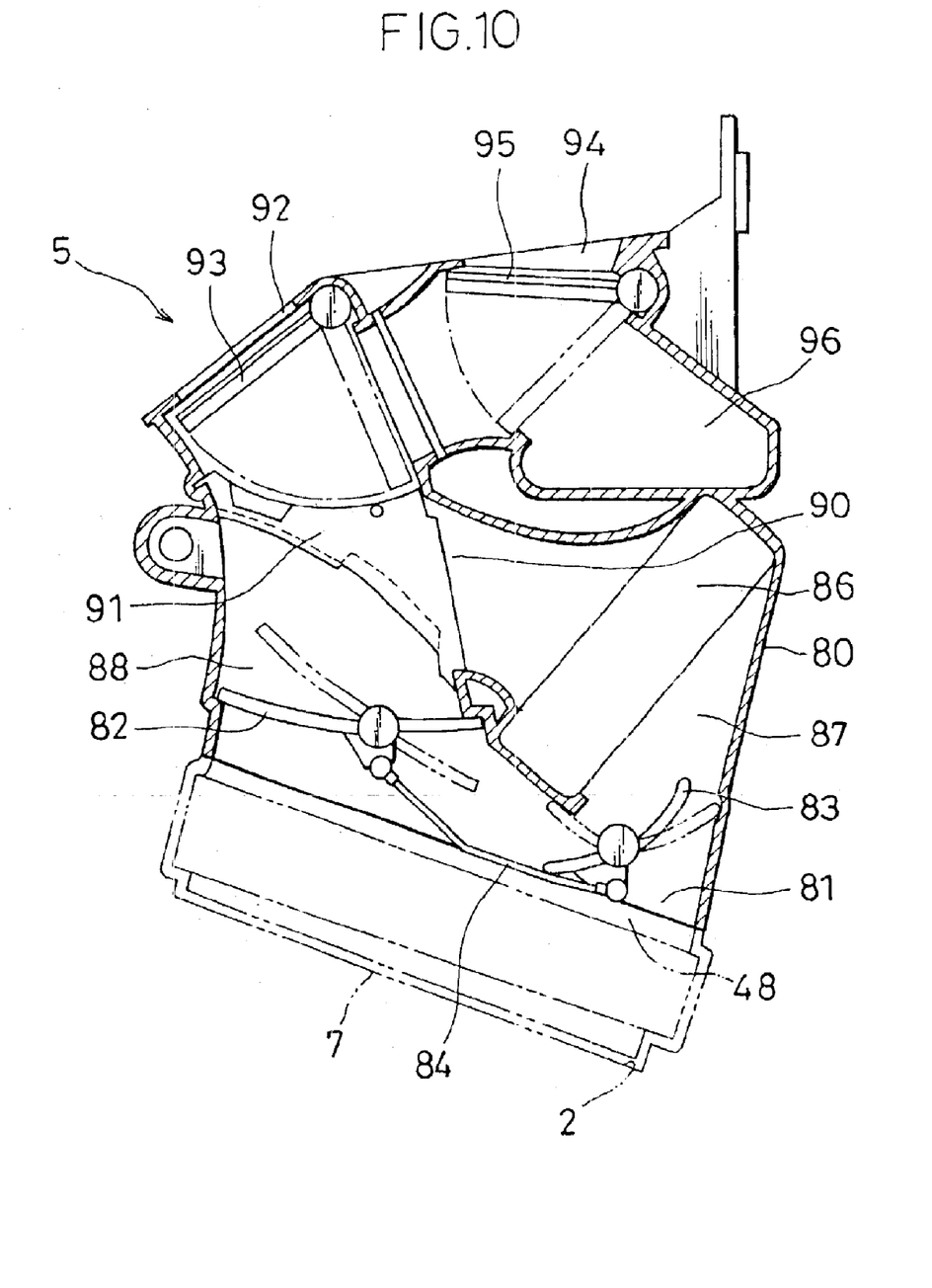
FIG. 10 is a longitudinal sectional view of the air-conditioning unil

Above the cool air intake port 81, an air-mix door 82 and an auxiliary door 83 are provided and the two doors 82 and 83 are linked with each other via a lever 84 so as to allow them to move by interlocking with each other. Above (toward the downstream side) the air-mix door 82 and the auxiliary door 83, the heater core 86 which is heated by the engine cooling water is provided and control for temperature adjustment is achieved by using the air-mix door 82 and the auxiliary door 83.

When the air-mix door 82 and the auxiliary door 83 are set at the positions indicated by the solid lines in FIG. 10, a cool air passage 88 is closed and a heating passage 87 is open to allow all the cool air to flow toward the heater core 86 creating a maximum heating environment in which the cool air becomes heated. Then, as the air-mix door 82 and the auxiliary door 83 are rotated, as indicated by the 2-point chain lines, the cool air passage 88 is opened and the heating passage 87 is closed thereby creating a maximum cooling environment in which all the cool air is allowed to flow into the cool air passage 88. When the air-mix door 82 and the auxiliary door 83 are both at the middle position, the two passages 87 and 88 are left open to appropriate degrees and, as a result, the cool air and the warm air are mixed in a mixing passage 90 where the heating passage 87 and the cool air passage 88 merge to achieve a continuous temperature adjustment.

In this embodiment, a baffle plate 91 is provided at the position where the heating passages 87 and 88 merge so as to promote the mixing of cool air and warm air, and the cool air and the warm air are evenly mixed with each other as they pass through the baffle plate 91.

At the top of the air-conditioning case 80, a vent outlet 92 through which the temperature-adjusted air is supplied to a vent outlet port, a defrost outlet 94 through which the air is supplied to a defrost outlet port and a warm air outlet 96 through which the air is supplied to a foot level outlet port are provided. In addition, a mode door 93 used to control the open/closed state of the vent outlet 92 and a mode door 95 that selectively switches to the defrost outlet 94 or the warm air outlet 96 are provided, and open/close control is implemented by employing an actuator (not shown) through the use of the two mode doors 93 and 95 in conformance to the outlet mode setting. It is to be noted that a mesh 101 is mounted at the defrost outlet 94 so as to soften the outlet air, and the warm air outlet tube 102 through which the warm air is guided toward the passengers' feet is connected to the warm air outlet 96.

Figure 9:
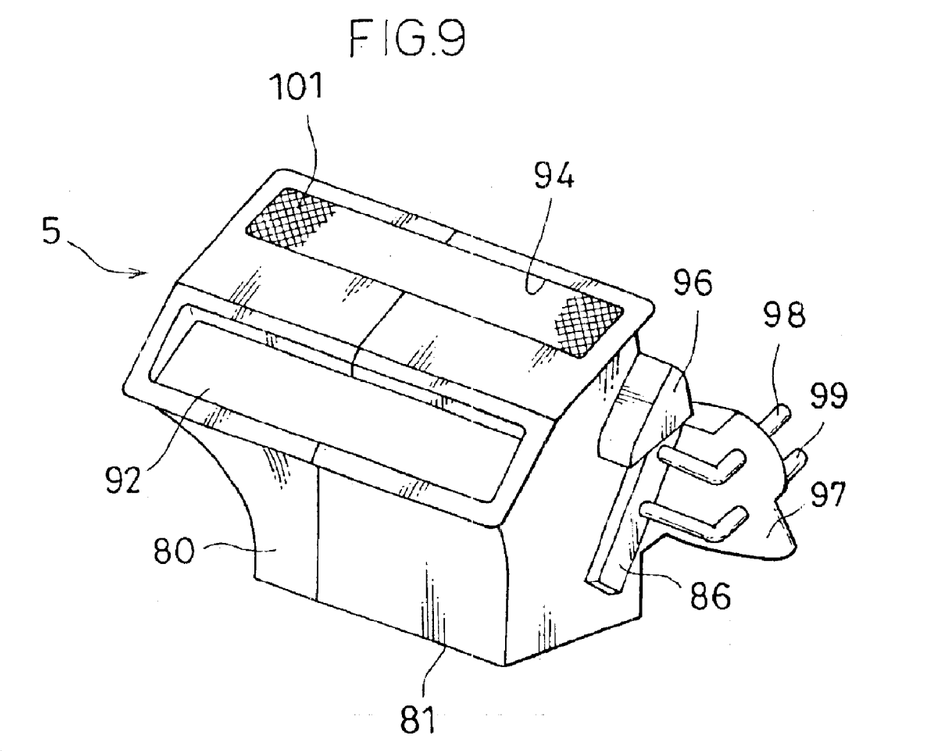
FIG. 9 a perspective view of the air-conditioning unit.

Reference numerals 98 and 99 each indicate a cooling water pipe for the heater core 86, which pass through the center of a holding plate 97 fixed to the air-conditioning case 80. The holding plate 97, which is covered with urethane, is pressed against the engine compartment partitioning wall to achieve a good seal. Reference numeral 100 indicates a mounting member provided at the air-conditioning case 80, which is used when installing the air-conditioning case 80 at the vehicle body.

In the structure described above, as the fan 13a of the blower 13 rotates, the cabin internal air or the external air is allowed in through the internal air intake port 54 or the a external air intake port 55 selected at the intake unit 4, and the air thus taken in travels through the air filter 57 and is guided into the blower/evaporator housing case 2 through the intake port 45. The air then passes through the pair of outlet portions 16 and 46 and is blown into the evaporator housing unit 7.

The intake air is cooled as it passes through the evaporator 18, and the cooled air is supplied into the air-conditioning unit 5 through the cool air outlet port 48. As the air passes through the evaporator 18, the moisture contained in the intake air condenses at the fins and drops of water fall down to the evaporator housing lower case member 17 from the evaporator. The water then flows along the inclined surface and is drained to the outside of the vehicle through the drain hole 21. Since the lower recessed member 10 constituting the evaporator housing lower case member 17 has a horizontal parting line, there is no risk of the condensed water seeping through the parting line. In other words, the condensed water does not leak.

The blower/evaporator housing case 2 has its parting line extending along the horizontal direction and the locking means 25 used to lock the expansion valve 23 is provided over the joint portions 12a and 42a. The locking means 25 is constituted of the upper locking portion 25a and the lower locking portion 25b set on two sides of the parting line and the expansion valve 23 is securely mounted when the upper recessed member 9 and the lower recessed member 10 are bonded.

The expansion valve 23 is locked by clamping the coolant pipes 19 connected to the expansion valve 23 between the semicircular notches 26 and 50 constituting the locking means 25 and the exterior of the expansion valve 23 itself is enclosed by the guard members 27 and 51 with the projecting pieces 29 and 52 facing opposite each other behind the screw hole metal plate 30 used to fix the expansion valve 23 to the coolant pipes 19. As a result, the projecting pieces 29 and 52 prevent the screw hole metal plate 30 from moving backward to a position too far away for the screws 31 to reach the screw holes 32 when replacing the expansion valve 23, and a new expansion valve 23 can be mounted with ease.

Once cool air is supplied into the air-conditioning unit 5, the quantities of the cool air to flow through the cool air passage 88 and the heating passage 87 are adjusted in conformance with the degrees to which the air-mix door 82 and the auxiliary door 83 are opened. The cool air having passed through the heating passage 87 is heated at the heater core 86, which is then mixed with the cool air from the cool air passage 88 at the mixing chamber 90 to achieve a desired temperature. The temperature-adjusted air is then let out to the selected vent outlet 92, the defrost outlet 90 or the warm air outlet 96.

As explained above, according to the present invention in which the blower/evaporator housing case for housing the blower and the evaporator is constituted with the upper and lower recessed members set on the two sides of the parting line extending along the horizontal direction, condensed water collected by the lower recessed member does not leak.

In addition, the blower/evaporator housing case includes the scroll unit where the blower is housed on one side relative to the middle of the blower/evaporator housing case and the evaporator housing unit where the evaporator is housed on the other side, and thus achieves a structure which allows the blower and the evaporator to be housed with ease. The fan of the blower is inserted through the opening at the lower recessed member of the blower/evaporator housing case to mount the blower and condensed water is accumulated at the draining structure and is drained to the outside of the vehicle through the drain hole. In the upper recessed member constituting the blower/evaporator housing case, the intake unit is mounted at the intake port and the air-conditioning unit is mounted at the cool air outlet port.

Since the joint portions are formed at the edges of the upper and lower recessed members constituting the blower/evaporator housing case and the means for locking the expansion valve is formed over the joint portions, the coolant pipes and the expansion valve attached to the front ends of the coolant pipes are also firmly attached to the housing case when the evaporator is housed inside the upper and lower recessed members. Since the locking means is constituted with semicircular notches at which the coolant pipes are clamped and guard members that cover the expansion valve, the expansion valve becomes locked when the coolant pipes become clamped between the semicircular notches and the expansion valve is covered and thus protected by the guard members.

Since the projecting pieces projecting from the upper and lower guard members support from behind the screw hole metal plate used to mount the expansion valve at the coolant pipes with the screws, the projecting pieces disallow any backward movement of the screw hole metal plate when replacing the expansion valve and thus the reassembly process is facilitated.

Between the scroll unit and the evaporator housing unit at the lower recessed member, a bridge portion is provided toward the engine compartment partitioning wall. Thus, the area over which the scroll unit and the evaporator housing unit are linked via the narrow outlet portion of the scroll unit, which is lacking in structural strength, can be reinforced. Consequently, even when the blower/evaporator housing case is transported, no damage occurs due to insufficient rigidity and an improvement in the vibration resistance is also realized.

What is claimed is:

1. An air-conditioning system for a vehicle, comprising:
a blower/evaporator housing case housing and setting a blower rotated by a motor and creating an air flow and an evaporator connected to coolant piping through which coolant flows in/out side-by-side along the horizontal direction, wherein:
said blower/evaporator housing case is constituted of two recessed members, which are an upper recessed member and a lower recessed member, separated by a parting line extending along the horizontal direction;
an intake unit for selecting the source of air to be taken in is connected to an intake port of said blower at said blower/evaporator housing case; and
an air-conditioning unit having a heater core for implementing outlet temperature control and outlet mode control is connected at a cool air outlet port formed toward a downstream side of said evaporator at said blower/evaporator housing case;
wherein edges of said upper recessed member and said lower recessed member constituting said blower/evaporator housing case include joint portions, and a means for locking which locks an expansion valve is formed on said joint portions.

2. An air-conditioning system according to claim 1, wherein
said blower/evaporator housing case includes a scroll unit in which said blower is housed ranging on one side from the middle of said blower/evaporator housing case and an evaporator housing unit in which said evaporator is housed ranging on another side from the middle of said blower/evaporator housing case.

3. An air-conditioning system according to claim 1, wherein
an opening at which a fan of said blower is inserted and a drain hole for draining condensed water are formed at said lower recessed member of said blower/evaporator housing case.

4. An air-conditioning system according to claim 1, wherein
said intake port and said cool air outlet port are formed at said upper recessed member of said blower/evaporator housing case.

5. An air-conditioning system for vehicles according to claim 1, wherein
said means for locking is constituted of semicircular notches for clamping said coolant piping and guard members for covering said expansion valve.

6. An air-conditioning system for vehicles according to claim 5, wherein
said guard members provided at said upper recessed member and said lower recessed member include projecting pieces formed to support from behind a screw hole metal plate for mounting said expansion valve at said coolant piping with screws, respectively.

7. An air-conditioning system for a vehicle, said system comprising:
a blower/evaporator housing case including an upper recessed member and a lower recessed member, said upper recessed member being connected to said lower recessed member along a parting line, said blower/evaporator housing case including a scroll unit and an evaporator housing unit;
a rotary blower housed in said scroll unit of said blower/evaporator housing case to create an air flow in a downstream direction, said rotary blower having an intake port;
an intake unit mounted to said blower/evaporator housing case and operably connected to said intake port of said rotary blower to provide air intake into said rotary blower;
an evaporator housed in said evaporator housing unit of said blower/evaporator housing case downstream of said rotary blower and connected to coolant inflow and outflow pipes;
a cool air outlet port formed in said blower/evaporator housing case downstream of said evaporator; and
an air-conditioning unit connected to said blower/evaporator housing case at said cool air outlet port, said air-conditioning unit having a heater core for providing outlet temperature control and outlet mode control;
wherein said blower/evaporator housing case includes an air outlet portion connecting between said scroll unit and said evaporator housing unit, said air outlet portion constituting an air flow channel defined between a pair of upright sidewalls; and
wherein a bridge portion is provided to connect between said scroll unit and said evaporator housing unit, said bridge portion being disposed outside said air flow channel of said air outlet portion to provide structural reinforcement of said air outlet portion of said blower/evaporator housing case.

8. An air-conditioning system according to claim 7, further comprising
a lock clamp device clamping said coolant inflow and outflow pipes to said evaporation housing unit of said blower/evaporator housing case; and
wherein said bridge portion is connected between said scroll unit and said lock clamp device.

9. An air-conditioning system according to claim 7, wherein
said intake unit is constructed for selecting a source from which air is to be taken into said intake port of said rotary blower.

10. An air-conditioning system according to claim 7, wherein
said parting line is a horizontal parting line.

11. An air-conditioning system according to claim 7, wherein
said upper recessed member and said lower recessed member have respective edges thereof along said parting line, and said edges respectively include joint portions; and
a locking clamp device is provided on said joint portions to lock an expansion valve to said blower/evaporator housing case.

12. An air-conditioning system according to claim 11, wherein
said locking clamp device comprises circular notches for clamping said coolant piping, and guard members for covering said expansion valve.

13. An air-conditioning system according to claim 12, wherein
said guard members include projecting pieces formed to support from behind a screw hole metal plate for mounting said expansion valve at said coolant piping with screws, respectively.

14. An air-conditioning system according to claim 7, wherein
an opening at which a fan of said blower is inserted and a drain hole for draining condensed water are formed in said lower recessed member of sad blower/evaporator housing case.

15. An air-conditioning system according to claim 7, wherein said intake port and said cool air outlet port are formed in said upper recessed member of sad blower/evaporator housing case.

16. An air-conditioning system for a vehicle, said system comprising:

a blower/evaporator housing case including an upper recessed member and a lower recessed member, said upper recessed member being connected to said lower recessed member along a parting line, said blower/evaporator housing case including a scroll unit and an evaporator housing unit;

a rotary blower housed in said scroll unit of said blower/evaporator housing case to create an air flow in a downstream direction, said rotary blower having an intake port;

an intake unit mounted to said blower/evaporator housing case and operably connected to said intake port of said rotary blower to provide air intake into said rotary blower;

an evaporator housed in said evaporator housing unit of said blower/evaporator housing case downstream of said rotary blower and connected to coolant inflow and outflow pipes;

a cool air outlet port formed in said blower/evaporator housing case downstream of said evaporator; and an air-conditioning unit connected to said blower/evaporator housing case at said cool air outlet port, said air-conditioning unit having a heater core for providing outlet temperature control and outlet mode control;

wherein said upper recessed member and said lower recessed member have respective edges thereof along said parting line, and said edges respectively include joint portions; and wherein a locking clamp device is provided on said joint portions to lock an expansion valve to said blower/evaporator housing case.

17. An air-conditioning system according to claim 16, wherein said intake unit is constructed for selecting a source from which air is to be taken into said intake port of said rotary blower.

18. An air-conditioning system according to claim 16, wherein said parting line is a horizontal parting line.

19. An air-conditioning system according to claim 16, wherein said locking clamp device comprises circular notches for clamping said coolant piping, and guard members for covering said expansion valve.

20. An air-conditioning system according to claim 19, wherein said guard members include projecting pieces formed to support from behind a screw hole metal plate for mounting said expansion valve at said coolant piping with screws, respectively.

21. An air-conditioning system according to claim 16, wherein an opening at which a fan of said blower is inserted and a drain hole for draining condensed water are formed in said lower recessed member of sad blower/evaporator housing case.

22. An air-conditioning system according to claim 16, wherein said intake port and said cool air outlet port are formed in said upper recessed member of sad blower/evaporator housing case.

* * * * *